United States Patent [19]

Quock et al.

[11] 4,048,102

[45] Sept. 13, 1977

[54] PROCESS FOR PREPARING FLEXIBLE POLYURETHANE FOAMS

[75] Inventors: Billy Quock, Richwood; Don Howard Kelley, Lake Jackson; Sehon Lester Warneke, Brazoria, all of Tex.

[73] Assignee: The Dow Chemical Company, Midland, Mich.

[21] Appl. No.: 754,768

[22] Filed: Dec. 27, 1976

Related U.S. Application Data

[63] Continuation-in-part of Ser. No. 569,904, April 21, 1975, abandoned, which is a continuation-in-part of Ser. No. 507,893, Sept. 20, 1974, abandoned, and a continuation-in-part of Ser. No. 634,674, Nov. 24, 1975, abandoned, which is a continuation-in-part of Ser. No. 570,336, April 21, 1975, abandoned.

[51] Int. Cl.$^2$ ............... C08G 18/06; C08G 18/14; C08G 18/28
[52] U.S. Cl. .............. 260/2.5 AM; 260/2.5 AZ; 260/77.5 AM; 260/77.5 AQ
[58] Field of Search ............... 260/2.5 AM, 2.5 AZ, 260/563 R

[56] References Cited

U.S. PATENT DOCUMENTS

| | | | |
|---|---|---|---|
| 3,660,326 | 5/1972 | Mallabar | 260/2.5 A |
| 3,832,311 | 8/1974 | Windemuth et al. | 260/2.5 AT |

OTHER PUBLICATIONS

Saunders et al. – Polyurethanes: Chemistry & Technology, I Chemistry (Interscience)(N.Y.)(1962), p. 240.
Glanzstoff – Chem. Abs. 71, 22575j (1969).
Allied – Chem. Abs. 74, 23710y (1971).
Wood et al. – Chem. Abs. 75, 6843x (1971).

*Primary Examiner*—Donald E. Czaja
*Assistant Examiner*—H. H. Fletcher
*Attorney, Agent, or Firm*—James G. Carter

[57] ABSTRACT

Menthanediamine, isophorone diamine and the like compounds have been discovered to be an effective substitute for 4,4'-methylenebis(2-chloroaniline) in the preparation of flexible polyurethane foams. This substituted crosslinker is not suspected of being carcinogenic.

22 Claims, No Drawings

PROCESS FOR PREPARING FLEXIBLE POLYURETHANE FOAMS

This application is a continuation-in-part of application Ser. No. 569,904 filed Apr. 21, 1975, which is a continuation-in-part of application Ser. No. 507,893 filed Sept. 20, 1974; and application Ser. No. 634,674 filed Nov. 24, 1975, which is a continuation-in-part of application Ser. No. 570,336 filed Apr. 21, 1975, all four applications being now abandoned.

This invention relates to polyurethane foams and more particularly it relates to flexible polyurethane foams.

Flexible polyurethane foams have heretofore been prepared from polyether triols and polyisocyanates, but the use of crosslinkers such as 4,4'-methylenebis(2-chloroaniline) has been employed. This compound has been suspected of being carcinogenic; therefore, the urethane industry has been searching for suitable substitutes for this compound.

It has now been unexpectedly discovered that compounds or mixtures of compounds repesented by the formula

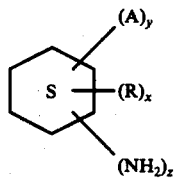

wherein A is represented by the group

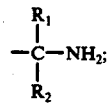

each R, $R_1$, and $R_2$ are independently hydrogen or an alkyl group having from 1 to about 4 carbon atoms; $x$ has a value from zero to about 4; $y$ has a value of 1 or 2; $z$ has a value of zero or 1 and when $y$ is 2, $z$ is zero and the sum of $y$ and $z$ is 2, can be substituted for the 4,4'-methylenebis(2-chloroaniline) in the preparation of flexible urethane foams and these compounds are not at the present time suspected of being carcinogenic.

It has further been discovered that flexible polyurethane foams having a 25% ILD (indentation load deflection) value of $\leq$5 lbs (2.27 kg) can be prepared employing the above described crosslinkers.

The present invention is therefore directed to flexible polyurethane foams having a modulus of at least about 2.3 resulting from subjecting to foaming conditions a composition which comprises:

A. a poiyol composition consisting essentially of
1. from about 50 to 100 and preferably from about 75 to 100 parts by weight of a primary hydroxyl-containing polyether triol having an average hydroxyl equivalent weight of from about 900 to about 2500,
2. from 0 to about 50 and preferably from 0 to about 25 parts by weight of a diol, a triol, a polymer-containing diol, a polymer-containing triol or mixtures thereof wherein said polyols have an average hydroxyl equivalent weight of from about 500 to about 2500 and preferably from about 1000 to about 2000 and said polymer has an average molecular weight of at least about 5000 to preferably at least about 20,000;

B. an organic polyisocyanate consisting of
1. from about 50% to 100% and preferably from about 75% to 100% by weight of 2,4-toluene diisocyanate, 2,6-toluene diisocyanate, NCO-containing prepolymers thereof or mixtures thereof, and
2. from 0 to about 50% and preferably from about 0% to 25% by weight of an organic polyisocyanate having an average functionality of at least 2;

C. from about 1.0 to about 5 and preferably from about 2.0 to about 3.0 parts by weight of water per 100 parts by weight of Component (A), D. from 0 to about 20 and preferably from about 5 to about 10 parts of a low boiling auxiliary blowing agent per 100 parts by weight of Component (A);

E. from about 0.1 to about 10 and preferably from about 1 to about 5 parts, and most preferably from about 1 to about 3 parts, per 100 parts by weight of Component (A) of a cross-linker composition essentially of
1. from 5 to 100 and preferably from 50 to 100 and most preferably from about 75 to about 100 percent by weight of a primary crosslinker component consisting of compounds or mixtures or compounds represented by the formula

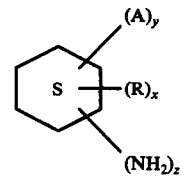

wherein A is represented by the group

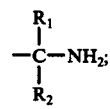

each R, $R_1$ and $R_2$ are independently hydrogen or an alkyl group having from 1 to about 4 carbon atoms; $x$ has a value from zero to about 4; $y$ has a value of 1 or 2; $z$ has a value of zero or 1 and when $y$ is 2, $z$ is zero and the sum of $y$ and $z$ is 2; and
2. from 0 to about 95 and preferably from 0 to about 50 and most preferably from about 0 to about 25 percent by weight of an auxiliary crosslinker component;

F. from about 0.5 to about 4 and preferably from about 0.7 to about 1.5 parts by weight per 100 parts by weight of Component (A) of a catalyst for the urethane reaction;

G. from about 0.005 to about 2.5 and preferably from about 0.02 to about 2.0 parts by weight per 100 parts by weight of Component (A) of a silicone oil cell control agent;

and wherein Components (A), (B), (C) and (E) are present in quantities so as to provide an NCO:active hydrogen equivalent ratio of from about 0.8:1.0 to about 1.3:1.0 and preferably from about 0.9:1.0 to about 1.1:1.0.

The present invention is also directed to flexible polyurethane foams having a 25% ILD value of $\leq$5 lbs.

The present invention is also directed to a process for preparing flexible polyurethane foams having a modulus of 2.3 and a 25% ILD value of $\leq 20$ pounds (9.07 kg) as determined by ASTM D-2406 or ASTM D-1564 which comprises admixing and subjecting to foaming conditions a composition comprising:

A. a polyol component comprising
   1. a diol having an average OH equivalent weight of from about 500 to about 2000 and preferably from about 900 to about 1200 and an ethylene oxide residue content of from about 0 to about 50% preferably from about 7% to about 20% by weight;
   2. a triol having an average OH equivalent weight of from about 500 to about 2000 and preferably from about 900 to about 1200 and an ethylene oxide residue content of from about 0 to about 50% preferably from about 7% to about 20% by weight; wherein the ratio of hydroxyl equivalents of (1) : (2) is from about 0.11:1 to about 1:1 and preferably from about 0.17:1 to about 0.42:1;
B. an organic polyisocyanate;
C. from about 1 to about 4 and preferably from about 2 to about 3 parts of water per 100 parts by weight of Component (A);
D. from about 5 to about 40 and preferably from about 15 to about 30 parts of a low boiling auxiliary blowing agent per 100 parts by weight of Component (A);
E. from about 0.1 to about 3 and preferably from about 0.3 to about 1.0 parts per 100 parts by weight of Component (A) of a crosslinker selected from the group consisting of compounds or mixtures of compounds reprsented by the formula

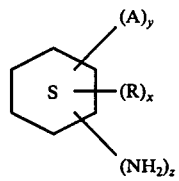

wherein A is represented by the group

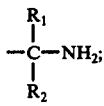

each R, $R_1$ and $R_2$ are independently hydrogen, or an alkyl group having from 1 to about 4 carbon atoms; $x$ has a value from zero to about 4; $y$ has a value of 1 to 2; $z$ has a value of zero or 1 and when $y$ is 2, $z$ is zero and the sum of $y$ and $z$ is 2;

F. from about 0.2 to about 3.0 and preferably from about 0.4 to about 1.5 parts of a catalyst for urethane formation per 100 parts by weight of Component (A);
G. from about 0.2 to about 3 and preferably from about 0.5 to about 2 parts of a silicone oil cell control agent per 100 parts by weight of Component (A); and wherein Component (A), (B), (C) and (E) are present in quantities so as to provide an NCO:active hydrogen ratio of from about 0.9:1 to about 1.2:1 and preferably from about 0.93:1 to about 1.1:1.

For the purpose of this application, ILD (indentation load deflection) is defined as that value obtained by the test methods of ASTM D-1564 and ASTM D-2406 and that the modulus is the 65% TLD value divided by the 25% ILD value.

Suitable primary-hydroxyl containing triols which may be suitably employed herein include the reaction products of glycerine, trimethylolpropane, hexane triol, mixtures thereof or the like, with a 1,2-alkylene oxide having from 2 to about 4 carbon atoms or a mixture of such alkylene oxides and subsequently endcapping the resultant polyol with at least 1 mole of ethylene oxide per hydroxyl group and wherein the resultant endcapped triol has an average hydroxyl equivalent weight of from about 900 to about 2500 and preferably from about 1200 to about 2000. The primary-hydroxyl containing polyether polyol usually contains from about 4 to about 20% by weight of ethylene oxide on the end of the molecule.

The term polymer-containing diols and triols which may be employed herein include those diols and triols having an average hydroxyl equivalent weight in the range of from about 500 to about 2500 and preferably from about 1000 to about 2000 and which contain from about 2 to about 50 and preferably from about 5 to about 25 parts by weight of a polymer having an average molecular weight of at least about 5000, and preferably at least about 20,000.

Such polymers may be physically blended with the diol or triol or they may be prepared insitu in the diol or triol wherein the diol or triol, or mixture thereof, are employed as the solvents or reaction medium for the polymerization and in some instances, the polymers are grafted onto the diol or triol.

Suitable such polymers and methods for their preparation are taught in U.S. Pat. Nos. 3,405,162; 3,652,639; 3,304,273; 3,383,351; and 3,523,093. So much of those applications as pertains to polymers and methods for their preparation are incorporated herein by reference.

The polymers may also be prepared by the aqueous emulsion techniques common to the latex art or as a dispersion in a non-isocyanate reactive medium. The polymers may be employed in the dry form, i.e., added to the triol or diol after removal of the water or non-isocyanate reactive medium therefrom or preferably the latex or dispersion itself may be added to the diol or triol and the water or non-isocyanate reactive medium subsequently removed therefrom by known procedures for removing water or other components from polyols such as evaporation under vacuum and the like.

The polymers employed herein may contain groups which are reactive with the NCO groups contained in the polyisocyanate, but it is not a requirement herein that said polymers contain such groups.

Particularly suitable polymers are those prepared by polymerizing one or more monomers containing ethylenic unsaturation such as, for example, styrene, acrylic acid, methacrylic acid, acrylonitrile, butadiene, crotonic acid, itaconic acid, dimethylaminomethymethacrylate, acrylamide, maleic acid, ethylacrylate, methylacrylate, butylacrylate, methylmethacrylate, ethylmethacrylate, butylmethacrylate, 2-ethylhexylacrylate, 2-ethylhexylmethacrylate, vinyl chloride and monomethmaleate.

Suitable diols and triols which may be employed herein include those prepared by the reaction of a compound containing 2 or 3 active hydrogen groups such as, for example, water, ethylene glycol, propylene glycol, 1,4-butane diol, 1,6-hexane diol, glycerine, trimethylol propane, mixtures thereof and the like with 1,2-epoxy compounds such as ethylene oxide, 1,2-propylene oxide, 1,2-butylene oxide, 2,3-butylene oxide, styrene oxide, alternate additions as well as mixtures thereof and the like and which have an average hydroxyl equivalent weight of from about 500 to about 2500. Also suitable are the polyester diols having an average hydroxyl equivalent weight of from about 500 to about 2500.

Suitable organic polyisocyanates which may be employed in admixture with the toluene diisocyanate or NCO-containing prepolymers thereof include any such isocyanate which does not contain a substituent group other than the NCO groups which is capable of reacting with the polyether triol. Suitable such isocyanates include polymethylene polyphenylisocyanate,
1,4-naphthalenediisocyanate,
cumene-2,4-diisocyanate,
4-methoxy-1,3-phenylenediisocyanate,
4-chloro-1,3-phenylenediisocyanate,
4-bromo-1,3-phenylenediisocyanate
4-ethoxy-1,3-phenylenediisocyanate,
isophoronediisocyanate,
2,4′-diisocyanatodiphenylether
5,6-dimethyl-1,3-phenylenediisocyanate,
2,4-dimethyl-1,3-phenylenediisocyanate,
4,4′-diisocyanatodiphenylether,
benzidinediisocyanate,
4,6-dimethyl-1,3-phenylenediisocyanate,
4,4′-diisocyanatodibenzyl,
9,10-anthracenediisocyanate,
3,3′-dimethyl-4′-diisocyanatodiphenylmethane,
2,6′-dimethyl-4,4′-diisocyanatodiphenyl,
2,4′-diisocyanatostilbene,
3,3′-dimethyl-4,4′-diisocyanatodiphenyl,
3,3′-dimethoxy-4,4′-diisocyanatodiphenyl,
1,4-anthracenediisocyanate,
2,5-fluorenediisocyanate,
1,8-naphthalenediisocyanate,
2,6-diisocyanatobenzfuran,
2,4,6-toluenetriisocyanate,
2,4,4′-triisocyanatodiphenylether,
crude or undistilled isocyanates, and
dimers or trimers of toluene diisocyanates.

Other organic polyisocyanates that can be used are the polyisocyanates described in Canadian Pat. No. 700,026 and in U.S. Pat. No. 2,683,730; the phenyl indane diisocyanates which are described in U.S. Pat. No. 2,855,385, the organic diisocyanates and the organic triisocyanates which are described in U.S. Pat. No. 2,292,443; and the organic triisocyanates which are described in U.S. Pat. No. 2,929,794.

Suitable NCO-containing prepolymers of 2,4- and 2,6-toluenediisocyanate which can be employed as the polyisocyanate component (B-1) includes those prepared by reacting an excess of the toluene diisocyanate with a substance having from 2 to about 4 active hydrogen atoms and an active hydrogen equivalent weight of from about 30 to about 2500, preferably from about 30 to about 300.

Suitable such active hydrogen-containing substances include, for example, ethylene diamine, ammonia, methyl amine, aminoethylethanol amine, propylene diamine, ethylene glycol, glycerine, propylene glycol, butylene glycol, hexane diol, pentanediol bisphenols, halogen substituted bisphenols, neopentyl glycol, halogenated neopentyl glycol, adducts of such active hydrogen-containing substances with vic-epoxy-containing compounds such as for example, ethylene oxide, propylene oxide, 1,2-butylene oxide, 2,3-butylene oxide, styrene oxide, epichlorohydrin, epibromohydrin, phenyl glycidyl ether, butyl glycidyl ether, dibromophenyl glycidyl ether, mixtures thereof and the like.

It is preferred that the NCO-containing prepolymer contain from about 10% to about 45% free NCO groups by weight.

It should be understood that in the preparation of prepolymers from an excess of the toluene diisocyanate, that the resultant product will usually contain some unreacted toluene diisocyanate.

Suitable compounds which can be employed herein as Component (E-1) include for example, menthane diamine (1,8-diamino-p-methane), isophorone diamine (3-aminomethyl-3,5,5trimethylcyclohexylamine), 1,4-bis-(aminomethyl)cyclohexane, 1,3-bis(aminomethyl)cyclohexane, mixtures thereof and the like.

When menthane diamine is employed as the sole crosslinker in Component (E), it is preferably employed in quantities of from about 0.3 to 3 and most preferably from about 1.25 to about 2.25 parts per 100 parts by weight of Component (A).

When isophorone diamine is employed as the sole crosslinker in Component (E), it is preferably employed in quantities of from about 0.1 to about 2 and most preferably from about 0.35 to about 1.35 parts per 100 parts by weight of Component (A).

Suitable auxiliary crosslinker compounds include, for exaple, oxydianiline, tris(polyoxyalkylene alkanol)amines; mono-, di- and tri-isopropanol amines; oxyhydrocarbon or oxyhydroxycarboxy derivatives of isocyanuric acid or aryl substituted isocyanuric acid; vicinal hydroxyl amines containing at least 4 carbon atoms; mono-, di- and tri-ethanol amines; or an aliphatic diol or a polyether diol said diols having an OH equivalent weight of less than about 300 and preferably less than 200; or mixtures thereof.

Suitable tris(polyoxyalkylene alkanol)amines which may be employed herein include those represented by the formula

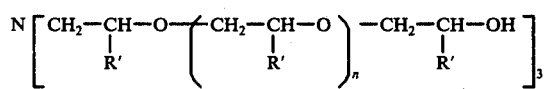

wherein R′ is independently hydrogen, methyl or ethyl, and each $n$ has an average value of from zero to about 5. The substances represented by the above formula are readily prepared by the condensation of ammonia with an alkylene oxide such as ethylene oxide, 1,2-propylene oxide, 1,2-butylene oxide, 1,2-isobutylene oxide, or mixtures thereof. The products of the condensation reaction are most generally a mixture of products, wherein the components of the mixture can be, if desired, separated by distillation or other suitable means or the mixture itself can be employed as an auxiliary crosslinker.

Suitable oxyhydrocarbon or oxyhydrocarboxy derivatives of isocyanuric acid or aryl substituted isocyanuric acid which may be employed herein are those represented by the general formula

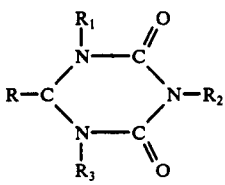

wherein R is =O or a member of the group represented by the formula

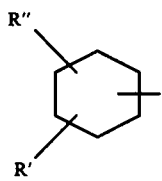

wherein each R' and R" are independently hydrogen, Cl, Br, OH or an alkyl group having from 1 to about 6 carbon atoms, each $R_1$, $R_2$ and $R_3$ is independently selected from the formulas

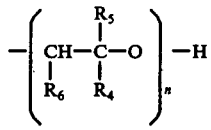

wherein each $R_4$ is independently hydrogen, phenyl, methyl, ethyl or halomethyl, each $R_5$ and $R_6$ are independently hydrogen or methyl with the proviso that only one of such groups can be a methyl group, each $n$ is independently 0, 1, 2 or 3; and

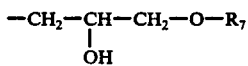

wherein $R_7$ is selected from the group consisting of allyl, methallyl, an aryl group, a haloaryl group, a dihaloaryl group or an alkaryl group; with the proviso that no more than 2 of the $R_1$, $R_2$, and $R_3$ groups can be represented by the formula

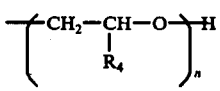

wherein $R_4$ is hydrogen, methyl or halomethyl.

Suitable 1,2-epoxy-containing compounds which may be employed include, for example, ethylene oxide, 1,2-propylene oxide, 1,2-butylene oxide, 2,3-butylene oxide, 1,2-isobutyleneoxide, epichlorohydrin, phenyl glycidyl ether, butylene glycidyl ether, styrene oxide, mixtures thereof and the like.

Suitable basic catalysts which may be employed include sodium hydroxide, potassium hydroxide, benzyl trimethyl ammonium chloride, tetramethyl ammonium chloride, tetramethyl ammonium bromide, dodecyl dimethyl(2-phenoxyethyl)ammonium bromide and the like.

Suitable solvents or reaction mediums which may be employed include, for example, carbontetrachloride, trichloromethane, dichloromethane, 1,2-dichloroethane, 1,1,2,2-tetrachloroethane, 1,1,2,2-tetrachloroethane, 1,1-trichloroethane, mixtures thereof and the like.

The isocyanuric acid from which many of the crosslinkers employed herein are prepared is a well known article of commerce.

The aromatic and substituted aromatic isocyanuric acid derviatives from which many of the crosslinkers are prepared may be prepared by the reaction of urea or biuret with benzaldehyde, substituted benzaldehyde, benzal chloride or substituted benzal chloride as taught in s-TRIAZINES AND DERIVATIVES, Interscience Publishers, Inc., 1959, pages 211-212.

Suitable such compounds represented by the above formula which may be employed as a crosslinker herein include for example, N-3-phenoxy-2-hydroxypropyl-N'-N"-bis(2-hydroxypropyl)isocyanurate, N-2-hydroxypropyl-N'-N"-bis(3-phenoxy-2-hydroxypropyl)isocyanurate, N-3-phenoxy-2-hydroxypropyl-N'-N"-bis(2-hydroxybutyl)isocyanurate, N-3-p-methyl-phenoxy-2-hydroxypropyl-N',N"-bis(2-hydroxypropyl)isocyanurate, N-2-phenyl-2-hydroxyethyl-N'-N"-bis(2-hydroxypropyl)isocyanurate, N,N',N"-tris(2-hydroxypropyl)-p-hydroxyphenylisocyanurate, N,N',N"-tris(2-hydroxypropyl)phenylisocyanurate, mixtures thereof and the like.

Suitable vicinal hydroxyl amine compounds which can be employed herein include, for example, those represented by the general formulas:

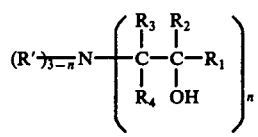

I.

wherein $R_1$, $R_2$, $R_3$ and $R_4$ are independently hydrogen, an alkyl group having from 1 to about 10 carbon atoms, or a —C—O—$R_5$ group wherein $R_5$ is an aliphatic hydrocarbon group having from 1 to about 10 carbon atoms, a phenyl group, a one to four carbon alkyl substituted phenyl group, or a mono or dihalo substituted phenyl group, R' is hydrogen, an aliphatic hydrocarbon group having from 1 to about 10 carbon atoms or a phenyl group and wherein $n$ has a value of 1 to 3 inclusive, with the proviso that the sum of the carbon atoms contained in the $R_1$, $R_2$, $R_3$ and $R_4$ groups is at least 2.

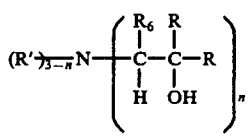

II.

wherein R and $R_6$ collectively represent a divalent 3 to 6 carbon atom saturated or unsaturated hydrocarbon group thereby forming a 5 to 8 membered ring and wherein R' and $n$ are as defined in Formula I above.

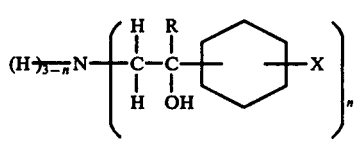

III.

or

-continued

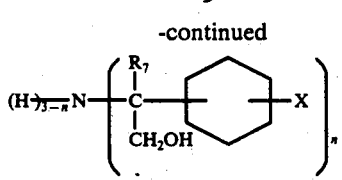

IV.

wherein each $R_7$ is independently hydrogen or an alkyl group having from 1-4 carbon atoms, each X is independently hydrogen, chlorine, bromine, or an alkyl group having from 1-4 carbon atoms and $n$ has a value of from 1 to 3 inclusive.

Suitable vicinal hydroxyl amine compounds include, for example,
1-amino-2-hydroxybutane,
bis( 2-hydroxybutyl)amine,
tris(2-hydroxybutyl)amine
3-phenoxy-2-hydroxpropylamine,
2-phenyl-2-hydroxyethylamine,
2-hydroxypropyl-N-phenylamine,
2-hydroxyethyl-N-phenylamine,
3-phenoxy-2-hydroxypropyl-N-phenylamine,
2-hydroxybutyl-N-phenylamine,
bis(3-phenoxy-2-hydroxypropyl)amine,
2-hydroxyethyl-N-(3-phenoxy-2-hydroxypropyl)amine,
1-amino-2-hydroxycyclopentane,
1-amino- 2-hydroxycyclooctane,
2-hydroxyethyl-N-(2-hydroxybutyl)amine.

The vicinal hydroxyl amine compounds are readily prepared by reacting ammonia, a primary or secondary amine or a primary or secondary hydroxyl amine with a vicinal epoxy-containing compound employing known procedures.

Suitable aliphatic diols which may be employed as a crosslinker herein include, for example, ethylene glycol, diethylene glycol, propylene glycol, dipropylene glycol, 1,2-butane diol, 1,3-butane diol, 1,4-butane diol, mixtures thereof and the like.

Suitale polyether diols which may be employed as a crosslinker include, for example, polyoxyethylene glycols, polyoxypropylene glycols, polyoxybutylene glycols, mixtures thereof and the like.

Suitable auxiliary blowing agents include aliphatic hydrocarbon boiling below 110° C or halogenated aliphatic hydrocarbons boiling below 110° C such as dichlorodifluoromethane, trichlorofluoromethane, hexane, hexene, or pentane as the blowing or foaming agent. Suitable foaming agents are disclosed in U.S. Pat. No. 3,072,582.

Suitable tertiary amine catalysts include, for example, triethylenediamine, N-ethylmorpholine, N(dimethylaminoethyl)pierazine, N,N'-bis(dimethylaminoethyl)piperazine, tetramethyl butanediamine, -dimethylethanolamine, bis(2dimethylaminomethyl) ether, mixtures thereof and the like.

Organometal catalyst such as stannous octoate, dibutyltindilaurate and the like may also be employed either alone or together with the tertiary amine catalyst if desired.

Inorganic and organic fillers such as, for example, calcium carbonate, barytes, sand, expandable polystyrene beads, and the like may be included in the foams of the present invention.

Fire retardant agents such as, for example, tris (2,3-dibromopropyl)phosphate; tris(2-chloroethyl)phosphate; tris(dichloropropyl)phosphate; triethylphosphate, mixtures thereof and the like may also be employed in the foams of the present invention.

Suitable silicone oils include polymers of dimethyl siloxane having a viscosity at 77° F of 5 centistokes or other silicone oils which are commercially available such as block copolymers of two or more alkylene oxides and containing siloxane groups. Such cell control agents are commercially available as BF 2270, DCF-1-1630 and L-5303 available from Goldschmidt, Dow Corning Corp. and Union Carbide Corp., respectively.

The following examples are illustrative of the present invention, but are not to be construed as to limiting the scope thereof in any manner.

In each of the following examples, Components (A), (C), (E), (F) and (G) were blended together until the components were equally dispersed. Then the isocyanate, Component (B), was quickly added and after stirring for several seconds, the mixture was foamed in a vented closed mold at the indicated temperature.

The compositions and physical properties of the foams are given in Tables I and 11. Unless otherwise indicated, the quantities of th components are in parts by weight.

TABLE I

|  | Example 1 | Example 2 | Example 3 | Example 4 | Example 5 | Example 6 | Example 7 |
|---|---|---|---|---|---|---|---|
| Polyol, type/parts | A/100 | A/100 | A/100 | A/100 | A/100 | A/100 | A/100 |
| Isocyanate, type/parts | A/36.5 | A/33.1 | B/34.7 | A/37.1 | A/32.6 | C/41.1 | D/38 |
| Water, parts | 2.5 | 2.5 | 2.5 | 2.5 | 2.5 | 2.5 | 2.5 |
| Crosslinker, type/parts | A/2 | A/0.5 | A/2 | A/2 | A/0.5 | A/2.0 | A/2.0 |
| Auxiliary Crosslinker, type/parts | none | none | none | none | none | none | none |
| Catalyst, type/parts | A/0.6 B/0.1 C/0.01 | A/0.6 B/0.1 C/0.01 | A/0.3 B/0.1 C/0.01 | A/0.3 B/0.1 C/0.01 | A.0.6 B/0.1 C/0.005 | A/0.3 B/0.1 C/0.01 | A/0.3 B/0.1 C/0.03 |
| Cell Control Agent, type/parts | B/0.03 | B/0.03 | B/0.03 | A/1.25 | A/0.25 B/0.025 | B/0.03 | B/0.03 |
| Mold Temp., ° F (° C) | 120 (48.9) | 120 (48.9) | 120 (48.9) | 120 (48.9) | 120 (48.9) | 120 (48.9) | 120 (48.9) |
| Density, lbs/ft³ (g/cm³) | 2.66 (0.043) | 2.66 (0.043) | 2.71 (0.043) | 2.88 (0.046) | 2.68 (0.043) | 2.69 (0.043) | 2.71 (0.043) |
| Tensile, psi (kg/cm²) | 19.2 (1.35) | 19.6 (1.38) | 23.5 (1.65) | 24.6 (1.63) | 19.1 (1.34) | 23.6 (1.66) | 23.5 (1.65) |
| Elongation, % | 186 | 225 | 285 | 210 | 183 | 226 | 285 |
| Tear Strength, lbs/in. (kg/cm) | 2.26 (0.4) | 2.12 (0.38) | 2.89 (0.52) | 2.54 (0.45) | 1.7 (0.3) | 2.72 (0.49) | 2.89 (0.52) |
| Resiliency, % | 57 | 59 | 55 | 59 | 55 | 51 | 55 |
| Compression set at 75% Deflection, % | 9.5 | 9.8 | 9.9 | 8.7 | 9.1 | 10.4 | 9.9 |
| ILD, 25%, lbs (ig) | 30 (13.61) | 32 (14.51) | 25 (11.34) | 42 (19.05) | 33 (14.97) | 33 (14.97) | 25 (11.34) |

4,048,102

TABLE I-continued

| | | | | | | | |
|---|---|---|---|---|---|---|---|
| 65%, lbs | 89 | 86 | 71 | 119 | 95 | 89 | 71 |
| (kg) | (40.37) | (39.01) | (32.20) | (53.98) | (43.09) | (40.37) | (32.20) |
| Modulus | 2.97 | 2.69 | 2.84 | 2.83 | 2.88 | 2.7 | 2.84 |

| | Example 8 | Example 9 | Example 10 | Example 11 | Example 12 | Example 13 | |
|---|---|---|---|---|---|---|---|
| Polyol, type/parts | A/100 | A/100 | A/100 | A/100 | A/100 | A/100 | |
| Isocyanate, type/parts | B/34.2 | B/37.7 | B/32.9 | B/35.3 | B/36.5 | A/40.1 | |
| Water, parts | 2.5 | 2.5 | 2.5 | 1.0 | 2.5 | 2.4 | |
| Crosslinker type/parts | A/0.3 | A/0.3 | A/0.3 | A/0.3 | A/0.3 | A/0.25 | |
| Auxiliary Crosslinker type/parts | B/2.5 | C/2 | D/0.5 | E/3 | F/2.0 | F/3 | |
| Catalyst, type/parts | A/0.3 | A/0.3 | A/0.3 | A/0.3 | A/0.3 | A/0.3 | |
| | B/0.1 | B/0.1 | B/0.1 | B/0.1 | B/0.1 | B/0.2 | |
| | C/0.01 | C/0.01 | C/0.01 | C/0.01 | C/0.01 | C/0.005 | |
| Cell Control Agent, type/parts | B/0.03 | B/0.03 | B/0.03 | B/0.03 | B/0.03 | B/0.03 | |
| Mold, Temp., °F | 120 | 120 | 120 | 120 | 120 | 120 | |
| (°C) | (48.9) | (48.9) | (48.9) | (48.9) | (48.9) | (48.9) | |
| Density, lbs/ft³ | 2.6 | 2.56 | 2.47 | 2.62 | 2.43 | 2.18 | |
| (g/cm³) | (0.042) | (0.041) | (0.04) | (0.042) | (0.039) | (0.035) | |
| Tensile, psi | 21.2 | 23 | 17.5 | 18.9 | 17.5 | 17.9 | |
| (kg/cm²) | (1.49) | (1.62) | (1.23) | (1.33) | (1.23) | (1.26) | |
| Elongation, % | 208 | 216 | 185 | 182 | 197 | 197 | |
| Tear Strength, lbs/in. | 2.23 | 2.14 | 1.68 | 1.5 | 1.52 | 1.66 | |
| (kg/cm) | (0.4) | (0.38) | (0.3) | (0.27) | (0.27) | (0.3) | |
| Resiliency, % | 60 | 53 | 56 | 60 | 50 | 52 | |
| Compression Set at 75% Deflection, % | 7.9 | 9.6 | 6.5 | 7 | 7.5 | 12.5 | |
| ILD, 25%, lbs | 35 | 23 | 26 | 32 | 25 | 27 | |
| (kg) | (15.88) | (10.43) | (11.79) | (14.51) | (11.34) | (12.25) | |
| 65%, lbs | 91 | 68 | 73 | 86 | 73 | 87 | |
| (kg) | (41.28) | (30.84) | (33.11) | (39.01) | (33.11) | (34.47) | |
| Modulus | 2.6 | 2.96 | 2.81 | 2.69 | 2.92 | 2.81 | |

| | Example 14 | Example 15 | Example 16 | Example 17 | Comparative Experiment A | Comparative Experiment B |
|---|---|---|---|---|---|---|
| Polyol, type/parts | A/100 | A/100 | A/100 | A/100 | A/100 | A/100 |
| Isocyanate, type/parts | B/32.8 | B/32.8 | B/32.8 | B/32.8 | B/33.05 | B/33.05 |
| Water, parts | 2.5 | 2.5 | 2.5 | 2.5 | 2.5 | 2.5 |
| Crosslinker, type/parts | B/1.0 | G/1.0 | A/1.0 | A/1.0 | H/1.0 | H/1.0 |
| Auxiliary Crosslinker type/parts | none | none | none | none | none | none |
| Catalyst, type/parts | A/0.45 | A/0.45 | A/0.45 | A/0.45 | A/0.45 | A/0.45 |
| | B/0.1 | B/0.1 | B/0.1 | B/0.1 | B/0.1 | B/0.1 |
| | C/0.005 | C/0.005 | C/0.005 | C/0.005 | C/0.005 | C/0.005 |
| | D/0.25 | D/0.25 | D/0.25 | D/0.25 | D/0.25 | D/0.25 |
| Cell Control Agent, type/parts | B/0.03 | B/0.03 | B/0.03 | B/0.03 | B/0.03 | B/0.03 |
| Mold Temp., °F | 125 | 125 | 125 | 125 | 125 | 125 |
| (°C) | (51.67) | (51.67) | (51.67) | (51.67) | (51.67) | (51.67) |
| Density, lbs/ft³ | 2.47 | 2.54 | 2.5 | 2.58 | FOAM COLLAPSED | FOAM COLLAPSED |
| (g/cm³) | (0.04) | (0.041) | (0.04) | (0.041) | | |
| Tensile, psi | 17.2 | 16.6 | 19 | 18.3 | | |
| (kg/cm²) | (1.21) | (1.17) | (1.34) | (1.29) | | |
| Elongation, % | 193 | 175 | 200 | 204 | | |
| Tear Strength, lbs/in. | 1.51 | 1.41 | 1.55 | 1.66 | | |
| (kg/cm) | (0.27) | (0.25) | (0.28) | (0.29) | | |
| Resiliency, % | 61 | 58 | 54 | 54 | | |
| Compression Set at 75% Deflection, % | 6.4 | 6.5 | 7.8 | 6.7 | | |
| ILD, 25%, lbs | 25 | 28 | 25 | 27 | | |
| (kg) | (11.34) | (12.7) | (11.34) | (12.25) | | |
| 65%, lbs | 70 | 74 | 71 | 72 | | |
| (kg) | (31.75) | (33.57) | (32.20) | (32.66) | | |
| Modulus | 2.8 | 2.64 | 2.84 | 2.67 | | |

| | Comparative Experiment C | Comparative Experiment D |
|---|---|---|
| Polyol, type/parts | A/100 | A/100 |
| Isocyanate, type/parts | B/32.8 | B/32.8 |
| Water, parts | 2.5 | 2.5 |
| Crosslinker, type/parts | H/1.0 | H/1.0 |
| Auxiliary Crosslinker, type/parts | none | none |
| Catalyst, type/parts | A/0.45 | A/0.45 |
| | B/0.1 | B/0.1 |
| | C/0.005 | C/0.005 |
| | D/0.25 | D/0.25 |
| Cell Control Agent, type/parts | B/0.03 | B/0.03 |
| Mold Temp. °F | 125 | 125 |
| (°C) | (51.67) | (51.67) |
| Density, lbs/ft³ (g/cm³) | FOAM COLLAPSED | FOAM COLLAPSED |
| Tensile, psi (kg/cm²) | | |
| Elongation, % | | |

TABLE I-continued

| | | |
|---|---|---|
| Tear Strength, lbs/in. | L | L |
| (kg/cm) | L | L |
| Resiliency, % | A | A |
| | P | P |
| Compression Set at 75% | S | S |
| Deflection, % | E | E |
| ILD, 25% | D | D |
| 65% | | |
| Modulus | | |

TABLE II

| | Example 18 | Comparative Experiment E | Example 19 |
|---|---|---|---|
| Polyol, type/parts | B/100 | B/100 | B/100 |
| Polyisocyanate, type/parts | B/34.1 | B/34.1 | B/34.1 |
| Water, parts | 2.5 | 2.5 | 2.5 |
| Isophorone diamine, parts | 0.6 | 0 | 0 |
| Menthane diamine, parts | 0 | 0 | 0.6 |
| Trichloromonofluoromethane, parts | 25 | 25 | 25 |
| Cell Control Agent, type/parts | C/1.5 | C/1.5 | C/1.5 |
| Catalyst, type/parts | A/0.2 | A/0.2 | A/0.2 |
| | B/0.15 | B/0.15 | B/0.15 |
| | D/0.2 | D/0.2 | D/0.2 |
| | E/0.2 | E/0.2 | E/0.2 |
| Mold Temp. °F | 125 | 125 | 125 |
| (°C) | (51.67) | (51.67) | (51.67) |
| Cure, °F/min. | 250/20 | 250/20 | 250/20 |
| Density, lbs/ft$^3$ (g/cc) | 1.13 (0.0181) | not determined | 1.2 (0.0192) |
| Tensile, psi (kg/cm$^2$) | 5.8 (0.407) | foam split and collapsed leaving large voids | 5.1 (0.3585) |
| Elongation, % | 260 | | 250 |
| Tear Resistance, lbs/in (kg/cm) | 1.4 (0.25) | | 1.0 (0.179) |
| Resiliency, % | 48 | | 41 |
| Compression set, 50%* | 32.4 | | 24.6 |
| 75%** | 23.4 | | 22.7 |
| 4-½" ILD 25% lbs (kg) | 4.8 (2.18) | | 4.6 (2.087) |
| 65% lbs (kg) | 12.1 (5.49) | | 11.8 (5.352) |
| Modulus | 2.52 | | 2.57 |

*obtained after humidity aging at 100% relative humidity at 250° F for 3 hours obtained on a 1" × 3" × 3" (2.54 cm × 7.62 cm × 7.62 cm) sample.
**obtained after dry heat aging at 158° F for 22 hours on a 2" × 2" × 1" (5.08 cm × 5.08 cm × 2.54 cm) sample.

The polyols employed in the examples as Component (A) were as follows:

POLYOL A — was the reaction product of glycerine with propylene oxide and end-capped with ethylene oxide. The polyol has an OH equivalent weight of about 1650 and contains from about 13 to about 15 percent by weight of ethylene oxide end capping.

POLYOL B — was a mixture of
1. 25 weight % of a polyoxypropylene glycol having an OH equivalent wight of about 1000 and
2. 75 weight % of a glycerine initiated polyoxypropylene glycol end capped with ethylene oxide to the extent that the resultant triol contained 10 wt. % ethylene oxide and had an OH equivalent weight of about 1000; the equivalent weight ratio of diol:-triol was about 0.33:1.

The polyisocyanates employed as Component (B) in the examples were as follows:

POLYISOCYANATE A — was a crude toluene diisocyante comprising about 66.6% 2,4-isomer and 26% 2,6-isomer and the remainder higher polyisocyanates, the crude products having an NCO equivalent weight of about 91.2.

POLYISOCYANATE B — was an 80/20 mixture of 2,4-/2,6-toluene diisocyanate having an NCO equivalent weight of about 87.

POLYISOCYANATE C — was an adduct of polyisocyanate B with an adduct of bisphenol A with ethylene oxide to an OH equivalent weight of about 255, said prepolymer having an NCO content of about 39.4%, an average NCO equivalent weight of about 107.

POLYISOCYANATE D — was an adduct of polyisocyanate B with a glycerine initiated polyoxypropylene glycol having an average OH equivalent weight of about 500, said adduct having an NCO content of about 42% and an average NCO equivalent weight of about 100.

The catalysts employed in the examples and comparative experiments were as follows:

CATALYST A — was a 33% solution of triethylene diamine in dipropylene glycol.

CATALYST B — was bis(2-dimethylaminoethyl)ether.

CATALYST C — was a tin catalyst for use in the preparation of polyurethane foams commercially available from Argus Chemica Corp. as Markure UL-1.

CATALYST D — was Thancat DM-70 commercially available from Jefferson Chemical Co. and which is a clear amber liquid having the following analysis:

| | |
|---|---|
| Color Gardner | 34 |
| Specific Gravity 20/20° C | 0.992 |
| Freezing Point, °C | 32.4 |
| Flash Point, COC, °F | 110 |
| Viscosity, cps, 25° C | 5.7 |
| 20° C | 45.6. |

CATALYST E — a mixture of 70% zinc octoate and 30% by weight of dioctyl phthalate commercially available from Argus Chemical Corp. as Markure UL-14.

The cell control agent employed in the examples and comparative experiments was as follows:

CELL CONTROL AGENT A — was a block copolymer silicone oil commercially available from Union Carbide Corp. as L-5303.

CELL CONTROL AGENT B — was a silicone oil commercially available from DOW Corning Corp. as DCF-1-1630.

CELL CONTROL AGENT C — was BF-2270, a silicone surfactant commercially available from Th. Goldschmidt Products Corp. having the following properties:

| | |
|---|---|
| Viscosity at 25° C, cps | 1300–1400 |
| Specific Gravity at 20° C | 1.03 |
| Hydroxyl number (mg KOH/gm) | 3536. |

The crosslinking employed in the examples as Component (E) were as follows:

CROSSLINKER A — was menthanediamine.
AUXILIARY CROSSLINKER B — was oxydianiline.
AUXILIARY CROSSLINKER C — was ethylene glycol.
AUXILIARY CROSSLINKER D ' was diethanolamine.
AUXILIARY CROSSLINKER E — was a 50% aqueous solution of 75% diisopropanolamine and 25% by weight of monoisopropanolamine.
AUXILIARY CROSSLINKER F — was a mixture consisting of 56% by weight of $H_2N-CH_2-CHOH-CH_2-Ch_3$, 39% by weight of $HN-(CH_2-CHOH-CH_2-CH_3)_2$ and 5% by weight of $N-(CH_2-CHOH-CH_2-CH_3)_3$.
CROSSLINKER G — was isophorone diamine.
CROSSLINKER H — was methylene dianiline.

We claim:

1. A process for preparing flexible polyurethane foam having a modulus of at least about 2.3 which comprises subjecting to foaming conditions, a composition comprising:
   A 1. from about 50 to 100 percent by weight of a primary, hydroxyl-containing polyether triol having an average hydroxyl equivalent weight of from about 900 to about 2500.
   2. from 0 to about 50 percent by weight of a polyol selected from a diol, a triol, a polymer-containing diol, a polymer-containing triol or mixtures thereof wherein said diols and triols have an average hydroxyl equivalent weight of from about 500 to about 2500 and said polymer has an average molecular weight of at least about 5000;
   B. an organic polyisocyanate consisting of
   1. from about 50% to 100% by weight of 2,4-toluene diisocyanate, 2,6-toluene diisocyanate, NCO-containing prepolymers thereof, and
   2. from 0 to about 50% by weight of an organic polyisocyanate having an average NCO functionality of at least 2;
   C. from about 1.0 to about 5 parts by weight of water per 100 parts by weight of Component (A);
   D. from about 0 to about 20 parts of a low boiling auxiliary blowing agent per 100 parts by weight of Component (A);
   E. from about 0.1 to about 10 parts per 100 parts by weight of Component (A) of a crosslinker composition consisting essentially of
   1. from 5 to 100 percent by weight of compounds or mixtures of compounds represented by the formula

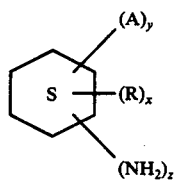

wherein A is represented by the group

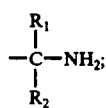

each R, $R_1$ and $R_2$ are independently hydrogen or an alkyl group having from 1 to about 4 carbon atoms, x has a value from zero to about 4; y has a value of 1 or 2; z has a value of zero or 1, and when y is 2, z is zero and the sum of y and z is 2, as a primary crosslinker component, and
   2. from 0 to about 95 percent by weight of an auxiliary crosslinker component;
   F. from about 0.5 to about 4 parts by weight per 100 parts by weight of Component (A) of a catalyst for the urethane reaction;
   G. from abut 0.005 to about 2.5 parts by weight per 100 parts by weight of Component (A) of a silicone oil cell control agent;
and wherein Components (A), (B), (C) and (E) are present in quantities so as to provide an NCO:active hydrogen equivalent ratio of from about 0.8:1.0 to about 1.3:1.0.

2. The process of claim 1 wherein Components (A), (B) and (E) are employed in quantities so as to provide an NCO: active hydrogen equivalent ratio of from about 0.9:1 to about 1.1:1, and Component (E) is present in quantities of from about 1 to about 5 parts by weight per 100 parts by weight of Component (A) and wherein Component (A) comprises from 50–100 parts of (1) and 0–50 parts by weight of (2).

3. The process of claim 2 wherein Component (E-1) is present in quantities of from about 75 to about 100 percent and Component (E-2) is present in from about 0 to about 25 percent.

4. The process of claim 3 wherein Component (E) consists of 100 percent of Component (E-1).

5. The process of claim 4 wherein Component (A-1) is a glycerine initiated polyether polyol.

6. The process of claim 5 wherein Component (A2) is absent from the composition.

7. The process of claim 2 wherein the silicone oil cell control agent, Component G, is a block compolymer of two or more alkylene oxides contaning siloxane groups.

8. The process of claim 4 wherein Component (E-1) is menthanediamine or isophorone diamine or mixtures thereof.

9. The process of claim 8 wherein Component (E) is isophorone diamine and is employed in quantities of from about 0.1 to about 2 parts per 100 parts of Component (A).

10. The process of claim 9 wherein Component (E) is employed in quantities of from about 0.35 to about 1.35 parts per 100 parts of Component (A).

11. The process of claim 8 wherein menthanediamine is employed as Component (E) in quantities of from about 0.3 to about 3 parts per 100 parts of Component (A).

12. The process of claim 11 wherein Component (E) is employed in quantities of from 1.25 to about 2.25 parts per 100 parts of Component (A).

13. A super-soft flexible polyurethane foa characterized by a modulus of at least about 2.3 and 25% ILD value of <5lbs (2.27 kg).

14. A process for preparing super-soft flexible polyurethane foams having a modulus of at least about 2.3 and a 25% ILD values of <20lbs (9.07 kg) which process comprises:
   A. a polyol component comprising
   1. a diol having an equivalent weight of from about 500 to about 2000 and an ethylene oxide content of from about 0 to about 50% by weight;

2. a triol having an equivalent weight of from about 500 to about 2000 and an ethylene oxide residue content of from about 0 to about 50% by weight; wherein the ratio of hydroxyl equivalents of (1):(2) is from about 0.11:1 to about 1.1:1;

B. an organic polyisocyanate;

C. from about 1 to about 4 parts of water per 100 parts by weight of Component (A);

D. from about 5 to about 40 parts of a low boiling auxiliary blowing agent per 100 parts by weight of Component (A);

E. from about 0.1 to about 3 parts per 100 parts by weight of Component (A) of a crosslinker selected from the group consisting of compounds or mixtures of compounds represented by the formula

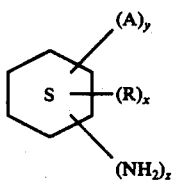

wherein A is represented by the group

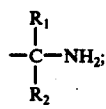

each R, $R_1$ and $R_2$ are independently hydrogen or an alkyl group having from 1 to about 4 carbon atoms $x$ has a value from zero to about 4; $y$ has a value of 1 or 2; $z$ has a value of zero or 1, and when $y$ is 2, $z$ is zero and the sum of $y$ and $z$ is 2;

F. from about 0.2 to about 3 parts of a catalyst for urethane formation per 100 parts by weight of Component (A);

G. from about 0.2 to about 3 parts of a silicone oil cell control agent per 100 parts by weight of Component (A); and wherein Components (A), (B), (C) and (D) are present in quantities so as to provide an NCO:active hydrogen ratio of from about 0.9:1 to about 1.2:1.

15. The process of claim 14 wherein Component (E) is selected from isophorone diamine, menthane diamine and mixtures thereof.

16. The process of claim 15 wherein Component (A-1) and (A-2) have OH equivalent weights of from about 900 to about 1200; the ratio of hydroxyl equivalents of (A-1):(A-2) is from about 0.17:1 to about 0.42:1, Component (C) is present in quantities of from about 2 to about 3 parts per 100 parts of Component (A); Component (D) is present in quantities of from about 15 to about 30 parts per 100 parts of Component (A); Component (E) is present in quantities of from about 0.4 to about 1.5 parts per 100 parts of Component (A), Component (G) is present in quantities of from that 0.5 to about 2.0 and the NCO:active hydrogen ratio of Components (A), (B), (C) and (D) is from about 0.95:1 to about 1.1:1.

17. The process of claim 16 wherein at least one of Components (A-1) and (A-2) contains from about 7% to about 20% ethylene oxide residue by weight.

18. The process of claim 17 wherein Component (A-2) contains from about 7% to about 20% ethylene oxide residue by weight.

19. The process of claim 18 wherein Component (A-1) is a polyoxypropylene glycol having an average OH equivalent weight of about 1000 and Component (A-2) is a glycerine initiated polyoxypropylene glycol end capped with about 10% ethylene oxide by weight and having an OH equivalent weight of about 1000.

20. The process of claim 19 wherein Component (D) is trichloromonofuoromethane.

21. The process of claim 20 wherein Component (B) is an 80/20 mixture of 2,4-/2,6-toluene diisocyanate.

22. The process of claim 21 wherein Component (E) is isophorone diamine.

* * * * *

UNITED STATES PATENT AND TRADEMARK OFFICE
CERTIFICATE OF CORRECTION

PATENT NO. : 4,048,102
DATED : September 13, 1977
INVENTOR(S) : Billy Quock, Don Howard Kelley, Sehon Lester Warneke It is certified that error appears in the above-identified patent and that said Letters Patent are hereby corrected as shown below:

Col. 1, Line 22 "repesented" should be --represented--.

Col. 1, Lines 58 and 63 "parts" should be --percent--.

Col. 2, Line 21 --consisting-- should be between "composition" and "essentially".

Col. 2, Line 26 "mixtures or" should be --mixtures of--

Col. 3, Line 34 "reprsented" should be --represented--.

Col. 4, Line 2 "TLD" should be --ILD--.

Col. 4, Lines 40 and 45 --"-- should appear before and after "latex".

Col. 4, Line 58 "dimethylaminomethmethacrylate" should be "dimethylaminomethylmethacrylate--, Col. 5, Line 66 a comma --,-- should appear between "pentanediol" and "bisphenols".

Col. 6, Line 17 "(1,8-diamino-p-methane)" should be --(1,8-diamino-p-menthane)--.

Col. 6, Line 18 "aminomethyl-3,5,5trimethylcyclohexylamine" should be --aminomethyl-3,5-5-trimethylcyclohexylamine--.

UNITED STATES PATENT AND TRADEMARK OFFICE
CERTIFICATE OF CORRECTION

PATENT NO. : 4,048,102

DATED : September 13, 1977

INVENTOR(S) : Billy Quock, Don Howard Kelley, Sehon Lester Warneke

It is certified that error appears in the above-identified patent and that said Letters Patent are hereby corrected as shown below:

Col. 6, Line 34 "exaple" should be--example--.

Col. 6, Line 36 "oxyhydroxycarboxy" should be--oxyhydrocarboxy--

Col. 6, Line 53--each--should appear between "wherein" and "R'".

Col. 7, Line 15 the formula should read

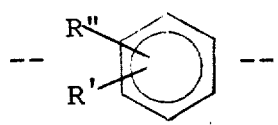

Col. 8, Line 7 "derviatives" should be--derivatives--.

Col. 8, Line 65 the formula should read

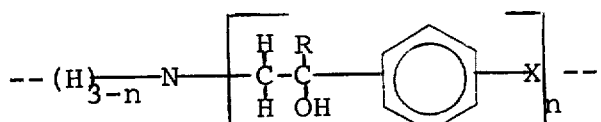

Col. 9, Line 5 the formula should read

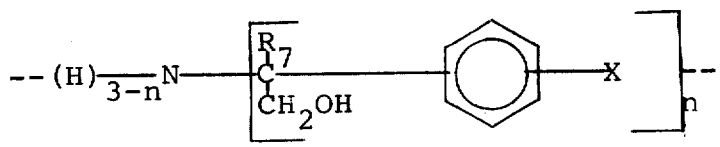

UNITED STATES PATENT AND TRADEMARK OFFICE
CERTIFICATE OF CORRECTION

PATENT NO. : 4,048,102

DATED : September 13, 1977

INVENTOR(S) : Billy Quock, Don Howard Kelley, Sehon Lester Warneke

It is certified that error appears in the above-identified patent and that said Letters Patent are hereby corrected as shown below:

Col. 9, Line 18 "3-phenoxy-2-hydroxpropylamine" should be --3-phenoxy-2-hydroxypropylamine--.

Col. 9, Line 40 "Suitale" should be--Suitable--.

Col. 9, Line 41--herein--should appear between "crosslinker" and "include".

Col. 9, Line 45 "hydrocarbon" should be--hydrocarbons--.

Col. 10, Line 8 "pierazine" should be--piperazine--.

Col. 10, Line 9 "dimethyle-" should be --dimethyl- --.

Col. 10, 10 "bis(2dimethylaminomethyl) should be--bis(2-dimethylaminomethyl)--'

Col. 10, Line 43 "ll" should be--II--.

Col. 10, Line 44 "th" should be--the--.

Col. 10, under Example 5 opposite catalyst, "A.O.6" should be--A/o.6--.

Col. 13, Line 54 "wight" should be--weight--.

Col. 13, Line 64 "cyante" should be--cyanate--.

Col. 14, Line 34 "Chemica" should be--Chemical--.

UNITED STATES PATENT AND TRADEMARK OFFICE
CERTIFICATE OF CORRECTION

PATENT NO. : 4,048,102          Page 4 of 5

DATED : September 13, 1977

INVENTOR(S) : Billy Quock, Don Howard Kelley, Sehon Lester Warneke

It is certified that error appears in the above-identified patent and that said Letters Patent are hereby corrected as shown below:

Col. 15, Line 1 "crosslinking" should be--crosslinkers--.

Col. 15, Line 7 "D'" should be--D- --.

Col. 15, Line 14 "Ch$_3$" should be--CH$_3$--.

Col. 15, Line 38 --or mixtures thereof--should appear between "thereof" and ", and".

Col. 16, Line 12 "abut" should read--about--.

Col. 16, Line 36 "(A2)" should read--(A-2)--.

Col. 16, Line 39 "compolymer" should read--copolymer--.

Col. 16, Line 40 "contaning" should read--containing--.

Col. 16, Line 56 --about-- should appear between "from" and "1.25".

Col. 16, Line 58 "foa" should read--foam--.

Col. 16, Line 59 --a-- should appear between "and" and "25%".

Col. 16, Line 63 "values" should read--value--

UNITED STATES PATENT AND TRADEMARK OFFICE
CERTIFICATE OF CORRECTION

PATENT NO. : 4,048,102
DATED : September 13, 1977
INVENTOR(S) : Billy Quock, Don Howard Kelley, Sehon Lester Warneke It is certified that error appears in the above-identified patent and that said Letters Patent are hereby corrected as shown below:

Col. 16, Line 63 "<20 lbs" should read --≦20 lbs--.

Col. 18, Line 20 "that" should read --about--.

Col. 18, Line 37 "trichloromonofuoromethane" should read --trichloromonofluoromethane--.

Signed and Sealed this

Tenth Day of January 1978

[SEAL]

Attest:

RUTH C. MASON
Attesting Officer

LUTRELLE F. PARKER
Acting Commissioner of Patents and Trademarks